(12) United States Patent
Eliasen

(10) Patent No.: US 7,213,368 B1
(45) Date of Patent: May 8, 2007

(54) APPARATUS FOR VERTICAL SLIDING PET DOOR

(76) Inventor: Mogens Eliasen, 3998C Riverview Road, Creston, BC (CA) V0B 1G2

( * ) Notice: Subject to any disclaimer, the term of this patent is extended or adjusted under 35 U.S.C. 154(b) by 0 days.

(21) Appl. No.: 11/349,573

(22) Filed: Feb. 9, 2006

(51) Int. Cl.
    *E05D 15/48* (2006.01)
(52) U.S. Cl. .................. 49/169; 160/116; 119/454
(58) Field of Classification Search .............. 49/163, 49/169, 374; 160/180, 116; 119/454
    See application file for complete search history.

(56) References Cited

U.S. PATENT DOCUMENTS

| | | | |
|---|---|---|---|
| 1,415,815 A * | 5/1922 | Ealy | 49/163 |
| 2,930,353 A * | 3/1960 | Sievers | 119/841 |
| 4,322,913 A | 4/1982 | Himmer | |
| 4,754,797 A | 7/1988 | Sronce | |
| 4,760,872 A * | 8/1988 | Hale, Jr. | 160/90 |
| 5,072,544 A | 12/1991 | Breck, Jr. | |
| 5,177,900 A | 1/1993 | Solowiej | |
| 5,735,079 A | 4/1998 | Davlantes | |
| D406,904 S | 3/1999 | Sronce | |
| 6,560,926 B1 * | 5/2003 | Gillett | 49/169 |
| 6,691,463 B1 * | 2/2004 | Richmond | 49/360 |

* cited by examiner

*Primary Examiner*—Jerry Redman

(57) ABSTRACT

The vertical sliding pet door can be used to let pets in and out easily by themselves. The pet needs to be trained in the usage of the pet door, and it also protects the house from unwanted bugs and other creatures such as rodents, as it closes as soon as the pet gets out through pet door. A locking mechanism is also provided, which helps to keep the house secure, when the sliding pet door is not being used.

1 Claim, 3 Drawing Sheets

APPARATUS FOR VERTICAL SLIDING PET DOOR

1. FIELD

The present disclosure pertains to an apparatus for Vertical Sliding Pet Door, in particular for people who have pets and wish to train their pets to be independent by providing an easily accessible Pet Door.

2. DESCRIPTION OF RELATED ART

The persistent need for easily accessible pet door, is understood by any person who has pets. Various methods have been invented in the past:

Some of the prior patents are U.S. Pat. Nos. 5,735,079, 5,177,900, 4,322,913, 4,754,797, 5,072,544

However, it has been found that the inventions related to prior patents are structurally and functionally different than the present one. For example, some of the prior patents have designs that use batteries or remote sensors, which could fail at times. Some other prior patents have swinging doors, that make the house less secure and also lets in unwanted creatures like bugs, rodents, etc.

3. BRIEF DESCRIPTION OF THE FIGURES

The present invention is illustrated by way of an example and is not limited by the figures presented in the following sections:

4. DETAILED DESCRIPTION

The following description provides an apparatus for Vertical Sliding Pet Door, which can be used by pets to go in and out of the house, without the owner having to bother about opening the door each time, the pet wants to go out. The following sections provide a description of the apparatus for Vertical Sliding Pet Door, its specific details, its features and its advantages over the other prior models.

Figure 1:
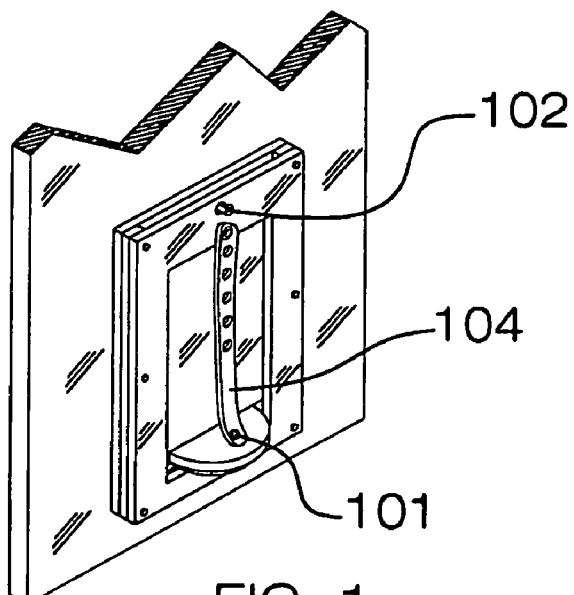
FIG. 1 illustrates the prototype of the embodiment, which is the Vertical Sliding Pet Door. It shows the side isometric view of the embodiment in its closed position, which is the Vertical Sliding Pet Door.

As previously discussed, the prior art patents have various limitations such as pet doors that use batteries or remote sensors, which could fail at times. Some other prior patents have swinging doors, that make the house less secure and also lets in unwanted creatures like bugs, rodents, etc. In contrast, the present invention endeavors to overcome the limitations faced by the prior art patents. The apparatus described as an embodiment in FIG. 1 is structurally different from all prior patents. It is an object of this invention to fulfill the need for an easily accessible pet door. It is an object of this invention to enable access to only pets that are trained in using the pet door. It is another object of this invention to keep out unwanted creatures like bugs and rodents and keep the home safe and secure. Another object of this invention is to provide the pets with a convenient pet door, thus eliminating the need for the owner to continually open or close the door for the pet. Another object of this invention is to provide home security by providing a locking mechanism in the pet door. In one embodiment, the pet door is attached to the regular door it moves vertically up and down on vertical sidetracks. The pet door has an attached internal piston/rod assembly that activates when the pet door is lifted by the pet and also allows the pet door to slide back down in a controlled manner. The pet can easily lift the pet door using a small horizontal platform. For example, the pet would place its nose under the platform and nudge the pet door upwards to enter. In another embodiment, the pet door could be accompanied with a training strap, which connects to pegs on the pet doorframe and on the horizontal platform. The strap would have series of holes that would allow the pet door to be held open at gradually lower heights. The pet would start training with a mostly open pet door and the pet would start to learn to nudge the pet door upwards. As the pet is trained use the pet door, the height could be gradually reduced until the pet has learned to open it from a completely closed position.

The apparatus for Vertical Sliding Pet Door, described in the present invention is easy-to-use, easy-to-install, convenient, time and effort saving, practical and durable for years of effective use. If manufactured, the apparatus could be produced in various sizes, shapes and colors to accommodate the pet's requirements.

FIG. 1 illustrates the prototype of the embodiment, which is the Vertical Sliding Pet Door. It shows the side isometric view of the embodiment in its closed position, which is the Vertical Sliding Pet Door. In one embodiment, the apparatus is attached to an existing door and is shown in a closed position. On the top of the pet door, there is a locking peg 102 and a strap hook 101 at the other end of the strap. The strap 104 can be used to keep the pet door locked and secure. If manufactured, the pet door could be made of hard plastic or light metal.

Figure 2:
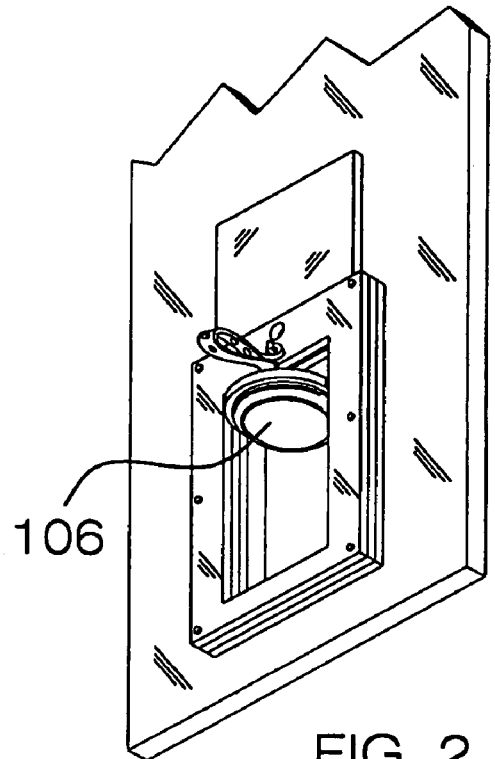
FIG. 2 illustrates the side isometric view of the embodiment shown in FIG. 1, in its open position.

FIG. 2 illustrates the side isometric view of the embodiment shown in FIG. 1, in its open position. In this embodiment, the door can be held open by connecting the strap 104 to the locking peg 102. The bottom of the horizontal platform is covered by a foam pad 106 to make it save and comfortable for the pet. The pet door functions on gravity and the piston/rod assembly fitting. The pet nudges the bottom of the horizontal platform and pushes the pet door up. After the pet has got out, the door slides back slowly and is closed completely.

Figure 3:
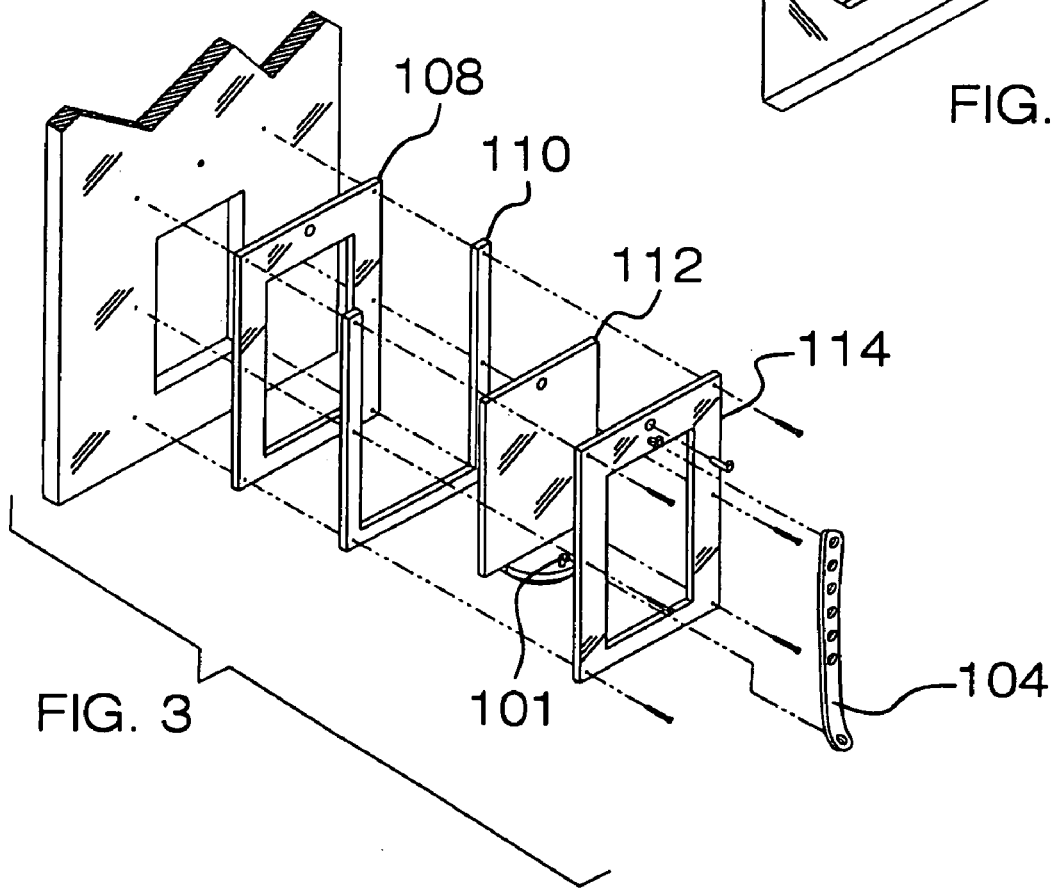
FIG. 3 illustrates the detailed isometric view of the embodiment shown in FIG. 1 with its removable parts separated.

FIG. 3 illustrates the detailed isometric view of the embodiment shown in FIG. 1 with its removable parts separated. In this embodiment, the apparatus could comprise of the back plate 108, spacer 110, piston door 112, front plate 114, strap hook 101, locking peg 102, strap 104 with adjustment holes and mounting screws. The front plate and the piston door have a strap hook at the top and bottom respectively. The locking peg can be found on the front plate. All the parts are connected together through mounting screws.

Figure 4:
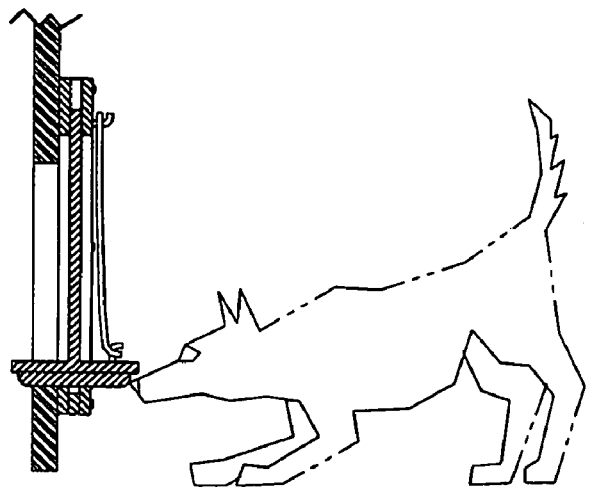
FIG. 4 illustrates the usage of the embodiment shown in FIG. 1.

FIG. 4 illustrates the usage of the embodiment shown in FIG. 1. In this embodiment, a trained dog is used to show how the apparatus works. The dog nudges the bottom of the horizontal platform and slowly nudges the platform up. The platform is attached to the sliding pet door at the base and as the platform moves upwards, the sliding door moves up too.

Figure 5:
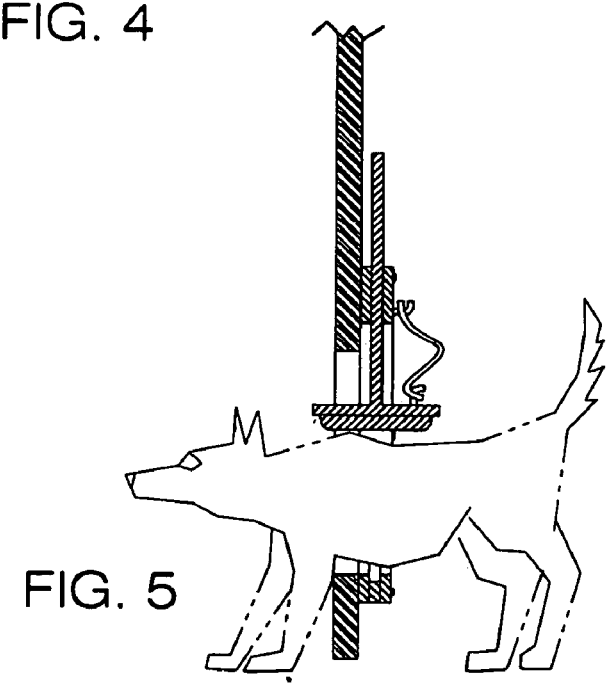
FIG. 5 illustrates the usage of the embodiment shown in FIG. 1.

FIG. 5 illustrates the usage of the embodiment shown in FIG. 1. In this embodiment, a trained dog is used to show how the apparatus works. As the sliding pet door moves upwards, the dog pushes itself out through the door. The height of the dog, keeps the door from sliding back down.

Figure 6:
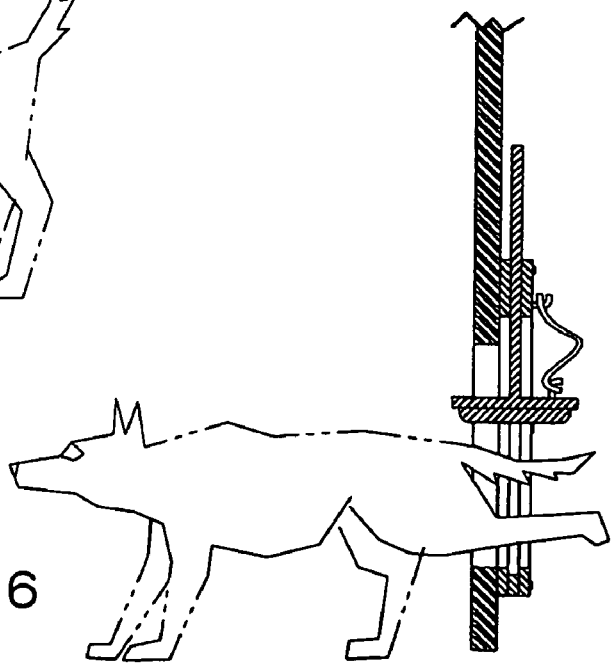
FIG. 6 illustrates the usage of the embodiment shown in FIG. 1.

FIG. 6 illustrates the usage of the embodiment shown in FIG. 1. In this embodiment, a trained dog is used to show how the apparatus works. As the dog gradually eases itself out of the door, the sliding pet door closes slowly. The pet door comes down through the pull of gravity and comes down slowly because of the rod assembly.

Figure 7:
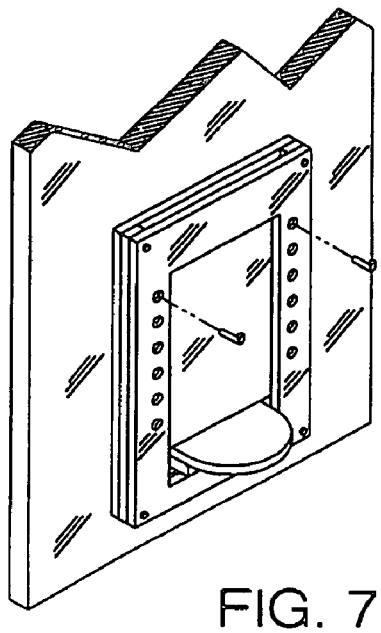
FIG. 7 illustrates locations of mounting screws as utilized by one embodiment.

FIG. 7 illustrates locations of mounting screws as utilized by one embodiment.

Figure 8:
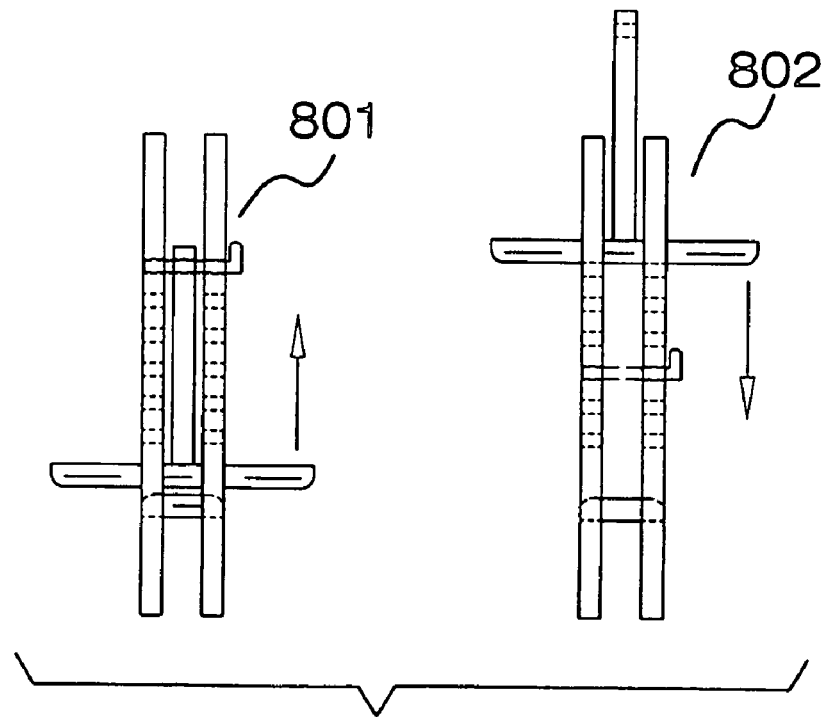
FIG. 8 shows an open and a closed position of the apparatus as utilized by one embodiment.

FIG. 8 shows an open and a closed position of the apparatus as utilized by one embodiment. The closed position is depicted by label 801 and the open position is depicted by label 802.

While certain exemplary embodiments have been shown and described in the accompanying drawings, it is to be understood that such embodiments are merely illustrative of and not restrictive on the broad invention, and that this invention not be limited to the specific constructions and arrangements shown and described, since various other modification may occur to those ordinarily skilled in the art upon studying this disclosure.

The invention claimed is:

1. A pet door comprising:
   a back plate with a hole in a top portion to allow a locking peg to pass through which connects to a door or wall;
   a spacer, between the back plate and a piston door a foam pad attached to the piston door;
   the piston door having a hole in a top portion to allow the locking peg to pass through the piston door, the spacer and a front plate; and
   the front plate with a hole in a top portion to allow the locking peg to pass through, the front plate with a training strap that is attached to the front plate, the training strap having a plurality of adjustment holes to gradually teach the pet to raise the foam pad, and the foam pad to protrude through the front plate to allow the pet to use as leverage to raise the piston door when the locking pin is not inserted.

* * * * *